United States Patent [19]

Mackey et al.

[11] 4,316,211
[45] Feb. 16, 1982

[54] COLOR KINESCOPE CONVERGENCE MEASURING SYSTEM

[75] Inventors: Donald Mackey, Haddonfield; Ernest D. Fox, Cherry Hill, both of N.J.

[73] Assignee: RCA Corporation, New York, N.Y.

[21] Appl. No.: 192,362

[22] Filed: Sep. 30, 1980

[51] Int. Cl.³ .............................................. H04N 9/62
[52] U.S. Cl. ....................................... 358/10; 315/368
[58] Field of Search ................ 358/10, 65; 315/13 C, 315/368

[56] References Cited

U.S. PATENT DOCUMENTS

| | | | |
|---|---|---|---|
| 3,623,816 | 11/1971 | Slavik | 356/176 |
| 3,723,801 | 3/1973 | Oxenham | 315/13 C |
| 4,035,834 | 7/1977 | Drury | 358/10 |
| 4,163,308 | 8/1979 | Tawa et al. | 29/25.19 |
| 4,193,086 | 3/1980 | Kawaguchi | 358/10 |

Primary Examiner—John C. Martin
Attorney, Agent, or Firm—E. M. Whitacre; P. J. Rasmussen; S. J. Stevens

[57] ABSTRACT

A convergence measuring apparatus for use with a color television kinescope and deflection yoke comprises means for activating two of the electron beams of the kinescope to generate a convergence test pattern on the kinescope display screen. The convergence test pattern is a set of alternating color patches. The degree of overlap and gap between patches is indicative of the degree of beam misconvergence. A monochrome television camera observes the test pattern and provides a signal to a signal processor which controls the electron beam activating means to move one color patch with respect to the other color to reduce the gap and overlap between patches. A measurement of the amount of patch movement necessary to minimize the overlap and gap between patches is an indication of electron beam misconvergence in the vicinity of the test pattern.

11 Claims, 13 Drawing Figures

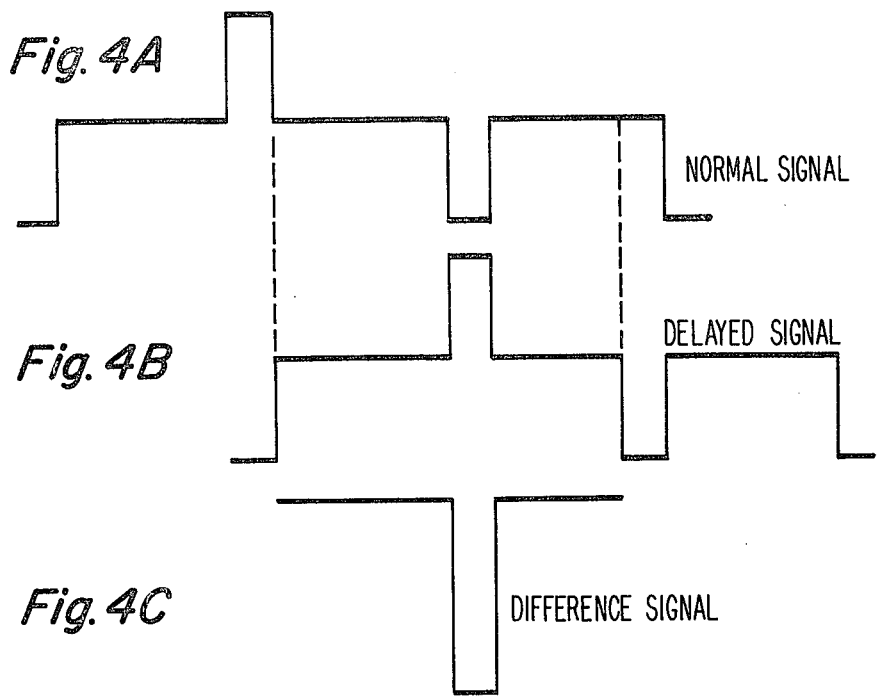
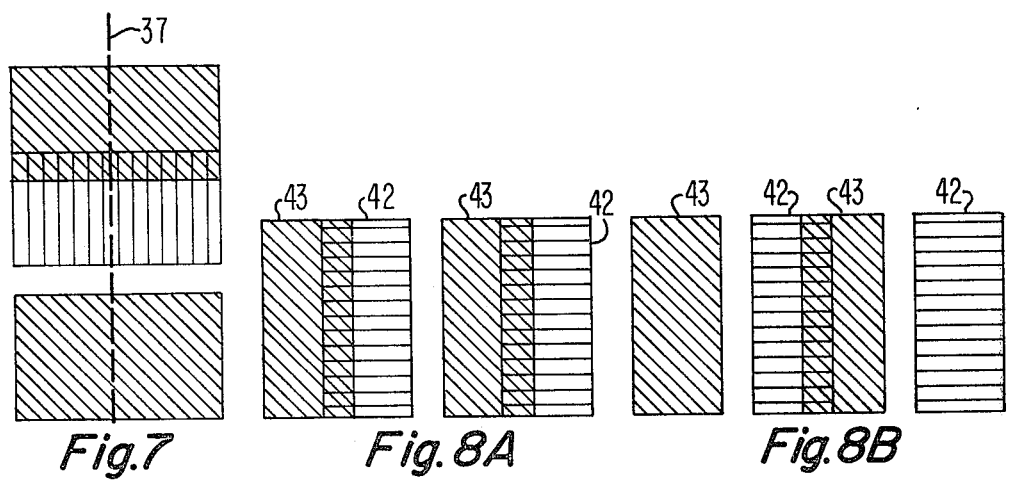

COLOR KINESCOPE CONVERGENCE MEASURING SYSTEM

This invention relates to an arrangement which automatically measures electron beam convergence on a color television kinescope.

Color television receivers may be manufactured having kinescopes with either three horizontally-aligned electron guns used with a self-converging deflection yoke, which can substantially converge the three electron beams at all points on the kinescope display screen without the need for dynamic convergence circuitry, or three electron guns arranged in a triangular or delta configuration, which requires dynamic convergence circuitry. Defects in manufacture and assembly, however, can cause beam misconvergences to occur with either kinescope type. These misconvergences may be caused by improper positioning or alignment of the deflection yoke, or by defects or variations in the yoke or kinescope itself. The location and nature of the misconvergences on the kinescope display screen can indicate the cause of the misconvergence. Corrections can then be made to improve any misconvergence so as to bring the kinescope and yoke combination within the specified tolerances of the receiver manufacturer, if possible.

It is desirable to have a means for obtaining this convergence information to facilitate accurate and efficient adjustment of the television receiver. This was previously done by manually inspecting the screen at several different screen locations while displaying a crosshatch or dot pattern with selected electron guns energized. This technique involved examining the position differences of lines or dots formed by particular electron beams, measuring these differences with a scale or other measuring device, and recording these measurements to permit a determination of the nature of the misconvergences and the correction needed.

Alternately, convergence correcting devices may be adjusted directly while viewing the kinescope screen, such as through the use of a yoke adjustment machine (YAM), in order to reduce misconvergence errors. This technique, in addition to being time consuming, requires highly trained individuals to determine the optimum convergence condition. These observers, even though skilled, depend upon their judgment to estimate measurements to within fractions of millimeters. Their judgment may be affected by tube variations, spot distortion, or by outside influences. Individual observers will also differ in their judgments.

U.S. Pat. No. 4,193,086, issued to Kawaguchi, discloses an arrangement which measures the misconvergence between lines scanned by the red, green and blue electron beams of a color television kinescope. A pair of cameras scan the screen horizontally and vertically, respectively, and provide signal information to a circuit incorporating a counter which determines the time differences between the peak value positions of the red, green and blue lines. This arrangement is undesirable from the standpoint that two cameras are required to measure horizontal and vertical convergence. The cameras must be carefully matched, so that the same output from either camera corresponds to a like convergence error. The precision to which convergence may be measured is also limited by the counter frequency.

The present invention is directed to a convergence measurement apparatus for use with a color television display system. The apparatus comprises means for generating a pair of substantially contiguous patterns on the display screen of a kinescope of the display system. Each of the patterns is formed of a single color, originating from one of the kinescope's electron guns. The amount of overlap or gap between the patterns indicates the extent of electron beam misconvergence. A single monochrome camera scans the kinescope display screen and produces an output signal indicative of the light output from the covergence patterns. This signal is processed and is applied to the pattern generator which moves one pattern with respect to the other until convergence is optimized. The amount of movement of the pattern is a measurement of misconvergence. Different combinations of pattern colors and pattern orientations permit measurement of misconvergence between all beam combinations in both horizontal and vertical directions. Reversal or alternation of pattern formation between two particular beams also may eliminate errors caused by kinescope manufacturing defects. The present invention may also be adapted for use with an apparatus which optimizes the convergence of the electron beams through adjustment of convergence circuitry or devices.

In accordance with the present invention, a convergence measurement apparatus is provided for use with a color television display system. The display system comprises a kinescope having a display screen and incorporating three electron beam producing means, and a deflection yoke for deflecting the beam in horizontal and vertical directions to form a raster on the display screen. The convergence measurement apparatus comprises means for activating one of the electron beam producing means to generate a first beam display area on the kinescope display screen. Means are provided for activating another of the beam producing means to generate second and third beam display areas on the screen, with the second and third areas occurring on opposite boundaries of the first display area and contiguous with the first display area upon occurrence of the convergence of the two electron beams in the vicinity of the display areas. The first display area overlaps one of the second or third areas to form an overlap zone and an associated gap zone upon occurrence of the misconvergence of the two beams.

The apparatus also comprises scanning means for detecting the light emitted from the display areas and the overlap and gap zones. Means, responsive to the scanning means output, develops a signal indicative of the order of occurrence of the overlap and gap zones and having an amplitude representative of the width of the overlap and gap zones. Means, responsive to the developed signal, modify a means for activating a beam producing means to effect a movement of the first display area with respect to the second and third areas in a direction tending to reduce the amplitude of the developed signal. Means are also provided for indicating the amount of motion of the first display area needed to minimize the amplitude of the developed signal.

In the accompanying drawings:

FIG. 4A is a representative scanned output signal from a convergence test pattern of the present invention, illustrating a condition of misconvergence;

FIG. 4B is the signal illustrated in FIG. 4A, delayed by a predetermined amount;

FIG. 4C is the resultant signal derived from the difference between the signals in FIGS. 4A and 4B;

FIG. 7 illustrates a convergence pattern in accordance with the present invention for use in measuring vertical convergence errors;

FIGS. 8A and 8B illustrate convergence patterns useful in understanding a misconvergence direction determining technique of the present invention.

The design of a convergence measuring or optimizing apparatus requires some means for displaying a convergence test pattern on the television picture tube screen and some means of observing that pattern in a way so that the beam landing locations can be identified and compared to obtain a measure of beam misconvergence. In the convergence measurement apparatus of the present invention, a monochrome television camera is used to observe the kinescope screen on which a convergence pattern is displayed. The camera output signal is processed to derive information regarding the nature and extent of any beam misconvergence.

Figure 1A:
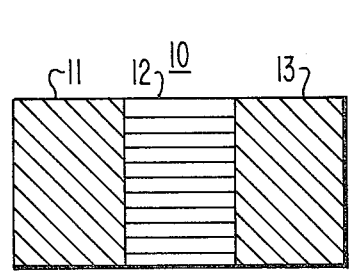
FIGS. 1A and 1B illustrate convergence test patterns provided in accordance with the present invention.

Referring to FIGS. 1A and 1B, and FIGS. 2A and 2B, the technique for obtaining a measurement of electron beam misconvergence from color display convergence test patterns will now be described. FIG. 1A illustrates a convergence test pattern 10 generated and used in convergence measurement by the apparatus of the present invention. Pattern 10 comprises color patches 11, 12 and 13. Patches 11 and 13 are of the same color, while patch 12 is of a different color. The colors of patches 11, 12, and 13 correspond to two of the three kinescope primary colors, i.e., red, green and blue. For example, patches 11 and 13 are shaded to represent green while patch 12 is shaded to represent blue. Other color combinations are processed in an identical manner. FIG. 1A illustrates patches 11, 12 and 13 as contiguous, with no overlap or gap between patches. This represents a condition indicative of convergence between the green and blue beams.

Figures 2A, 2B:
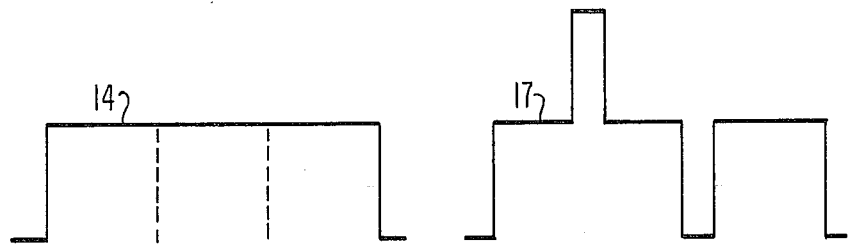
FIGS. 2A and 2B illustrate signal intensity measured from the patterns in FIGS. 1A and 1B, respectively, in accordance with the present invention.

FIG. 2A represents the output signal 14 from an observation monochrome camera as the camera scans across test pattern 10. The levels of the green and blue cathodes of the kinescope electron gun assembly have been previously adjusted so that each of the green and blue patches 11, 13 and 12 produces an identical light output as seen by the camera. The constant amplitude output signal also indicates convergence of the blue and green beams in the area of the screen where the test pattern 10 is located. The horizontal alignment of patches 11, 12 and 13 gives an indication of horizontal convergence between two beams. Vertical convergence is determined by aligning the three patches of pattern 10 in a vertical orientation.

Figure 1B:
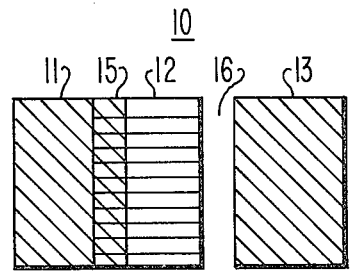

FIG. 1B illustrates convergence test pattern 10 in which the blue and green beams are horizontally misconverged in the area of the screen in which test pattern 10 is located. Blue patch 12 is shown shifted to the left so that it overlaps a portion of green patch 11 forming an overlap zone 15 and leaves a gap next to patch 13, forming a gap zone 16. The width of overlap zone 15 is substantially equal to the width of gap zone 16 and represents the amount of green and blue beam misconvergence. FIG. 2B is a waveform 17 of a camera output signal which represents the light output from the pattern shown in FIG. 1B. Waveform 17 shows that a sharp increase in light output occurs from the overlap zone 15, while a corresponding decrease in light output occurs in the region of the gap zone 16. The area under the increased portion of waveform 17 is directly related to the wdith of overlap zone 15. Therefore, the area under the increased portion of waveform 17 is a measure of the misconvergence between the beams which make up test pattern 10. It would be possible to make a determination of the area under the increased portion of waveform 17 and correlate this result into a direct relationship to misconvergence, but the degree of accuracy required in determining misconvergence makes this technique undesirable.

A general description of the misconvergence measurement procedure will now be described. Specific details relating to horizontally and vertically aligned patches will be examined in later paragraphs.

With a misconvergence condition such as that shown in FIG. 1B, the camera output waveform would be that shown as waveform 17 in FIG. 2B, as previously described. The order of occurrence of the increased and decreased signal components in waveform 17 indicates the direction of shift of patch 12 in relation to patches 11 and 13 of pattern 10. Based on this direction information, patch 12 is shifted at predetermined intervals by small fixed steps or amounts to reduce the widths of the overlap and gap zones until the order of occurrence of the overlap and gap related signal components changes. Essentially, patch 12 is moved toward a condition such as that shown in FIG. 1A; i.e., a condition of beam convergence. By knowing the number of steps necessary to align the patches and the distance moved in each step, the original amount of beam misconvergence may be determined. Because the movement steps are fixed in magnitude, the pattern will become misconverged in the opposite direction slightly during the last step. This misconvergence is necessary in order to determine signal component shift, as previously described. The fraction of a step necessary to perfectly converge the beams is interpolated from the final step by a method that will be explained subsequently in further detail.

A more detailed description of the previously described measuring technique including the method of signal processing, will now be made. As the operation is slightly different for horizontal and vertical measurements, a brief description of the common elements will first be made, followed by more detailed analyses of the horizontal and vertical measuring techniques.

Figure 3:
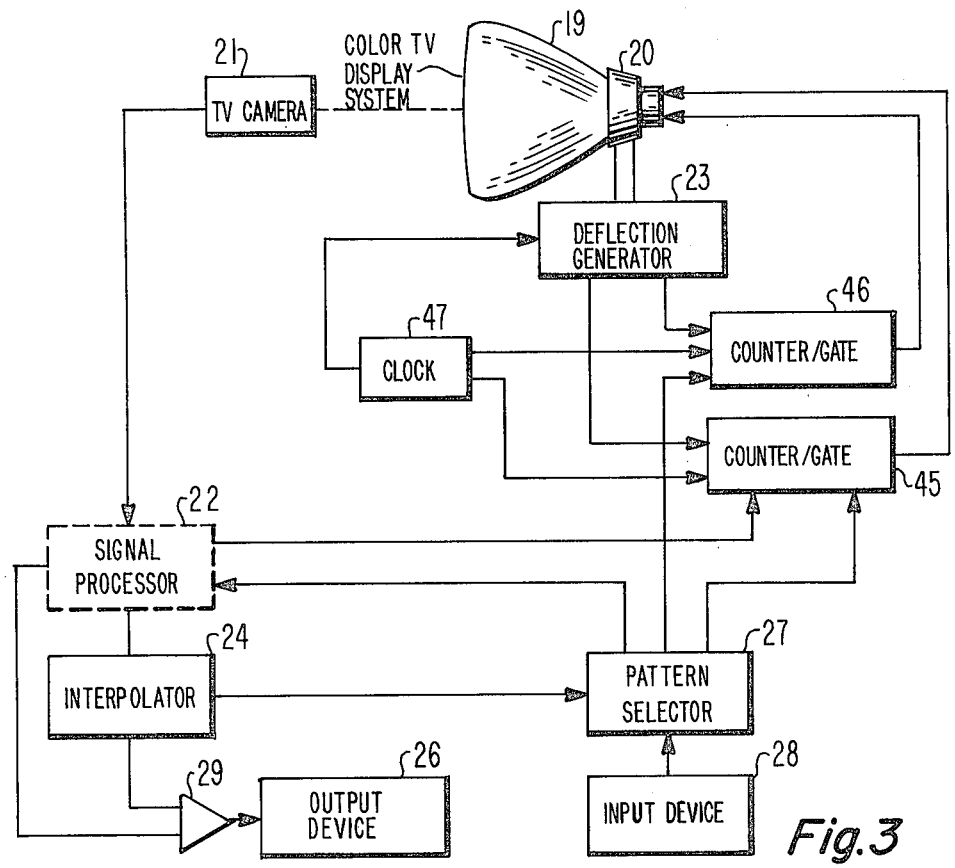
FIG. 3 illustrates a block diagram of the convergence measuring system of the present invention.

Referring to FIG. 3, there is shown an electron beam convergence measuring system comprising a color television display system on which the convergence measurements are taken comprising a three beam color kinescope 19, a deflection yoke 20, and a deflection generator 23. The kinescope 19 also incorporates a display screen on which the previously described convergence test patterns are displayed. Yoke 20 comprises horizontal and vertical deflection coils, which are driven by deflection generator 23. The measuring system also comprises a monochrome television camera 21 which observes the display screen of kinescope 19. The output of camera 21 is applied to a signal processor 22.

One output of signal processor 22 is applied to a counter/gate circuit 45. The output of counter/gate circuit 45 is applied to kinescope 19 for controlling the operation of one of the kinescope's electron beams. A second counter/gate circuit 46 also has its output applied to kinescope 19 for controlling another of the electron beams. Deflection generator 23 is coupled to counter/gate circuits 45 and 46. A fixed frequency clock 47 is also coupled to counter/gate circuits 45 and 46, and to deflection generator 23. The clock signal applied to deflection generator 23 maintains stable operation of the deflection generator, thereby eliminating jitter in the displayed patterns.

Another output of signal processor 22 is applied to an interpolator 24. One output of interpolator 24 is applied to a summer 29. An output of signal processor 22 is also coupled to summer 29. Another output of interpolator 24 is connected to a pattern selector 27, which in turn is coupled to signal processor 22, and counter/gate circuits 45 and 46. An input device 28 is also connected to pattern selector 27. The output of summer 29 is applied to an output device 26.

The measuring system operates in the following manner. The operator selects the desired test parameters from the range of system variables, e.g., the number of test pattern locations on the screen, the orientation of the patterns and the patch colors, and enters that information to pattern selector 27 through input device 28. The pattern selector 27 then initiates the pattern sequence (locations, orientation, color combinations) based on the particular signals applied to counter/gate circuits 45 and 46, and to signal processor 22. Counter/gate circuits 45 and 46 control the actual generation of the test patterns by providing drive signals directly to the cathodes of the kinescope 19 electron gun assembly, but they are programmed by the input information received from pattern selector 27. Prior to displaying the initial convergence pattern, the drive levels of the three cathodes are adjusted to provide identical light output to the monochrome camera 21.

For a convergence pattern such as that shown in FIG. 1B, for example, in which substantial beam misconvergence exists, the camera 21 supplies a signal having a waveform such as that of FIG. 2B to signal processor 22. Signal processor 22 determines the direction of misconvergence, i.e., center patch 12 shift, and provides this information to counter/gate circuit 45. Signal processor 22 also integrates the area under the misconvergence-related signal component. The information provided to counter/gate circuit 45 by signal processor 22 causes the center patch 12 to be shifted by a small fixed amount in a direction which tends to decrease the amount of patch overlap and gap; i.e., in a direction tending to create an appearance of beam convergence. The convergence pattern with a shifted center patch is then displayed and the signal processor 22 repeats its operation. If the misconvergence remains in the same direction, another fixed-step shift of patch 12 takes place. Such shifting occurs repeatedly until signal processor 22 determines that the direction of misconvergence has changed. When this happens, signal processor 22 provides interpolator 24 with information regarding the calculated area of the misconvergence signal component for the steps prior and subsequent to the misconvergence direction shift. With this information, interpolator 24 can calculate with precision the point within the last fixed shift at which no patch overlap or gap existed. This interpolated distance combined with the total distance shifted by fixed steps, gives a measurement of beam misconvergence for two particular beams at a particular screen location. The patch shift distance is supplied to output device 26 from signal processor 22 and interpolator 24 through summer 29. Output device 26, for example, may comprise a monitor for displaying this information on a printer which could record this information for later reference and analysis. The use of the monitor could facilitate manual adjustment to eliminate observation errors.

At the completion of the previously described measurement operation, a signal is given to pattern selector 27 from interpolator 24. This signal instructs the patten selector 27 to continue the pattern sequence. For each subsequent pattern, the measurement operation is carried out.

The convergence measurement system of FIG. 3 operates substantially as described for both horizontal and vertical convergence measurement. There is significant variation, however, in the manner in which the signal processing takes place. Further explanation of the horizontal and vertical measurement techniques will now be made with reference to FIGS. 3, 4A, 4B, 4C, 5 and 6.

Figure 5:
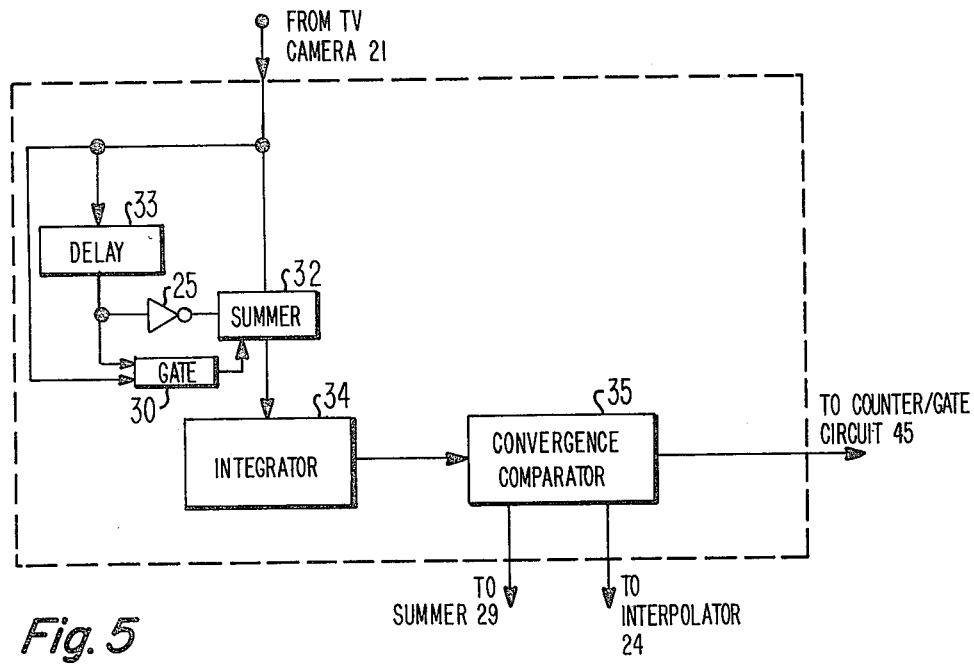
FIG. 5 illustrates a block diagram of one element of the signal processor shown in FIG. 3, for use in measuring horizontal convergence.

FIG. 5 shows a detailed block diagram of a portion of signal processor 22 comprising a horizontal convergence measurement circuit. The output from camera 21 is applied to a summer 32, a delay circuit 33, and a gate circuit 30. One output of delay circuit 33 is applied to summer 32 through an inverter 25. Another output of delay circuit 33 is applied to summer 32 through gate circuit 30. The output of summer 32 is coupled to an integrator 34 which in turn is coupled to a convergence comparator 35. Outputs of convergence comparator 35 are connected to an input of summer 29, to interpolator 24 and to counter/gate circuit 45.

Input device 28 is used to select the number of convergence patterns and their locations on the screen which will be measured for misconvergence. This can be done through mechanical means such as switches, or by computer control through software programming. Pattern selector 27 determines the sequence of beam combinations, pattern orientations and pattern locations in response to the signals from input device 28. Counter/gate circuits 45 and 46, through direct control of the electron beams, generate the actual patterns on the kinescope screen. Clock 47, which operates in one particular application at 14.32 MHz (four times the color subcarrier frequency) increments the counters of circuits 45 and 46 at a rate of 14.32 MHz. Information from pattern selector 27 programs circuits 45 and 46 to turn the selected electron beams on and off at particular counter values. For example, in the case of horizontally aligned patches as in FIGS. 1A and 1B, counter/gate circuit 46 controls one electron beam to produce the outer two patches. Counter/gate 45 produces the inner patch. The actual starting location of the pattern is determined by an initial counter value received from pattern selector 27. The counter is referenced to the beginning of each line; e.g., by the horizontal sync pulses. Line information is also provided to circuits 45 and 46 by deflection generator 23. This line information is also used by circuits 45 and 46 to control operation of the electron beams.

Camera 21 scans the displayed pattern for example, the pattern of FIG. 1B, and develops an analog signal based on the brightness output from the kinescope screen. The output signal from camera 21, having a waveform such as that shown in FIG. 2B and also 4A is applied to the horizontal convergence measurement circuit of FIG. 5 through one input of summer 32 and through delay circuit 33. Delay circuit 33 provides a period of signal delay equal to one patch width. The delayed signal from delay circuit 33, shown in FIG. 4B, is also applied to summer 32 through inverter 25. Summer 32 (which is controlled by gate circuit 30 in a manner which will be described later) combines these signals by adding the inverted delayed signal to the non-delayed signal, which effectively subtracts the two signals. The effect of delaying one signal with respect to the other is to cause the overlap and gap signal components to become aligned, as can be seen in FIGS. 4A and 4B. Subtracting the delayed signal from the normal non-delayed signal causes the steady-state signal components to cancel, leaving only a signal component corresponding to the magnitude of the sum of the overlap and gap signal components as represented by FIG. 4C. The polarity of this signal will depend upon the order to occurrence of the overlap and gap zones. The polarity of the output from summer 32 therefore gives an indication of the direction of misconvergence. The output from summer 32 is then integrated by integrator 34 which gives a value equal to the area under the camera output signal waveform corresponding to the overlap and gap signal components. Summer 32 is controlled by gate circuit 30 to be responsive to the normal and delayed input signals only in the vicinity of the aligned overlap and gap signal components, i.e. between dashed lines 50 and 51 in FIGS. 4A and 4B. If this limitation were not imposed, summer 32 would process the entire signal shown in FIGS. 4A and 4B. The integral of this resultant signal would, of course, be zero. This area is an indication of the magnitude of misconvergence of the electron beams which form the observed convergence test pattern. The integrator output is not used directly as a measure of misconvergence, but will be during final interpolation to arrive at a precise misconvergence measurement. Although the area of the overlap and gap signal components is theoretically identical and conceivably the integral of only one of these components would be sufficient, it is desirable that the integral of the signal component combination be taken in order to insure an accurate measurement. In practice the shape of the signal components may not be as sharply defined as in FIG. 2B, due to deflection defocussing or beam spot distortion, resulting in distortion of the waveform. Integration of the signal component combination tends to reduce measurement errors caused by this distortion, since the distortion present in each component tends to cancel when the components are combined. This novel technique for providing accurate misconvergence measurement with misshapen beam spots is not shown in the prior art. The integrator output value is applied to convergence comparator 35 which initially stores the value in its memory. Based on the polarity of the signal, convergence comparator supplies one of two signals to counter/gate circuit 45.

During the next television field or after a predetermined interval, counter/gate circuit 45 shifts the position of center patch 12 by modifying its gating circuits to turn the selected electron beam on and off at different counter values so that the location of patch 12 is altered by a predetermined number of counts. The counter frequency and the variation in count number determines the actual distance path 12 is shifted on the screen. The camera output signal for the convergence pattern having a shifted center patch is processed in a similar manner as that previously described. The convergence comparator 35 compares the sign of the integrated value to that previously stored. If the sign remains the same, it is an indication that a misconvergence in the same direction still exists. The convergence comparator 35 then updates its memory with the most recent integrated value and provides a signal to counter/gate circuit 45 to shift center patch 12 by another step.

If the sign of the integrated value has changed, it is an indication that the beams have moved through convergence during the last offset step and are now misconverged in the other direction. Convergence comparator 35 then provides interpolator 24 with the previously stored value (corresponding to a complete step) and the integrated value corresponding to the opposite direction misconvergence. This misconvergence represents less than a full step offset, so a ratio of this value to a full step value gives the distance of opposite direction misconvergence. This distance subtracted from a full step distance gives the fraction of misconvergence remaining following the previous full step. Convergence comparator 35 provides the total full step distance to a summer 29. Interpolator 24 provides summer 29 with the interpolated partial step misconvergence. The sum of these values gives a precise measure of beam misconvergence for one scan line of a particular convergence pattern. The misconvergence for each scan line of the test pattern is measured in this way and averaged to reduce any errors caused by distortions in the test pattern waveform or differences in convergence over the area of the test pattern. After the misconvergence for all lines of a test pattern is measured and averaged, a signal is provided to pattern selector 27 which continues the convergence pattern sequence until misconvergence of all beam combinations, orientations, and locations are measured. The misconvergence values from summer 29 are provided to output device 26, which may, for example, be a cathode ray tube or a printer, for displaying the misconvergence values for analysis.

Figure 6:
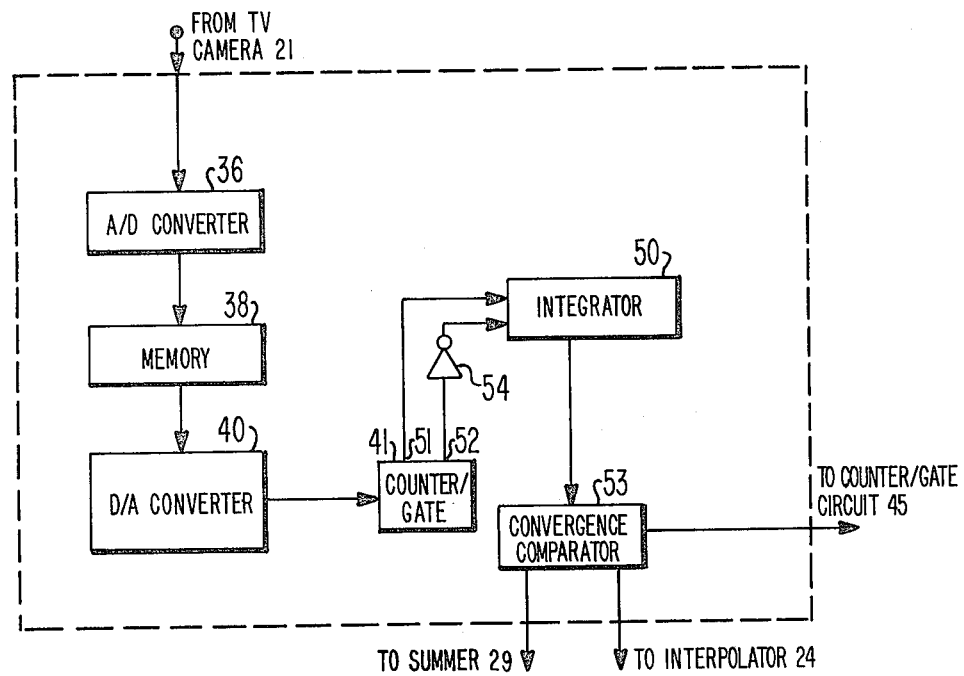
FIG. 6 illustrates a block diagram of another element of the signal processor shown in FIG. 3, for use in measuring vertical convergence.

Referring to FIGS. 6 and 7, the operation of the convergence measurement system for use in measuring vertical misconvergence will now be described. FIG. 6 is a detailed block diagram of a portion of the signal processor 22 shown in FIG. 3 for use in vertical misconvergence measurements. The output signal from camera 21 is applied to an analog-to-digital converter 36 comprising timing circuits which allow analog-to-digital converter 36 to sample one point from each line scanned by the camera 21. The point sampled is at the same horizontal position on the kinescope screen for a given convergence pattern. The sample location is chosen to fall approximately in the center of the patches of each convergence pattern. The sample location for a typical vertically aligned pattern is represented by dashed line 37 in FIG. 7. The signal sample for each line is stored in a memory 38 as a digital value. When line samples have been taken for the entire pattern, the sample values in memory 38 are applied to a digital-to-analog converter 40. Digital-to-analog 40 produces an output signal having a waveform similar in appearance to the horizontal convergence measurement waveform. The output from digital-to-analog converter 40 is then applied to a counter/gate circuit 41. The output from counter/gate circuit 41 is applied to an integrator 50. Counter/gate circuit 41 is programmed to provide the waveform signal from converter 40 to integrator 50 from a first output 51 during the first half waveform, and from a second output 52 during the second half waveform. An inverter 54 is present in the output 52 circuit. Integrator 50 integrates the signal from counter/gate circuit 41. During integration, integrator 50 receives the normal signal waveform during its first half and an inverted form of the waveform during its second half. The steady-state value of the waveform is removed during integration, therefore, and the integrated signal represents a combination of the overlap and gap signal components, given a signal which is similar to the output of integrator 34 of FIG. 5. The output from integrator 50 is then applied to a convergence comparator 53 which operates in a manner similar to convergence comparator 35 by supplying a signal to counter/gate circuit 45 which responds by delaying the location of the center patch by a greater or lesser number of television lines during the next television field. The amount of delay may be increments of 1 scan line. The new pattern having a vertically shifted center path will again be sampled in the manner described. If the polarity of the integrated signal is the same as that previously stored, a signal is provided to counter/gate circuit 45 to shift the center patch by an additional television line. If the polarity of the integrated signal has changed, the previously stored value and the new value is provided to interpolator 24 which calculates a misconvergence value in the manner previously described. The total distance of full line delay shifts and the final interpolated value are applied to summer 29 which calculates a total misconvergence for a particular convergence pattern and supplies that value to output device 26.

Using the measurement techniques described, it is convenient to sample horizontal convergence data during each scan line per field, thereby providing a number of total misconvergence values for each pattern that may be averaged to increase measurement accuracy and reduce random errors. Vertical measurement, on the other hand, produces only one misconvergence value per scan field, and to increase accuracy by sampling at several locations along the scan line would likely increase system complexity or increase measurement time greatly. In both horizontal and vertical measurement, it is desirable to measure convergence between two beams by taking the average of the convergence measurements for each beam producing the center patch. This beam alternation or color reversal technique reduces errors caused by defects in the phosphor or mask at particular screen locations. A feature of the invention sums the measured misconvergence errors at a given location for all color combinations as an error check. Since the sum is theoretically zero, any value for the sum represents a potential error condition, e.g., a line transient. If the sum exceeds a predetermined value (e.g., 8 mils), the measurement is considered invalid and is repeated.

The convergence measurement system of the present invention operates on the principle of eliminating any overlap or interference between different colored patches, a form of negative correlation. Previously used convergence sensing apparatus, such as Kawaguchi, attempt to determine convergence based on a deviation from a perfectly converged condition, i.e., superimposed dots or lines, which is a measurement of positive correlation.

An alternate method for determining the direction of beam misconvergence is shown in FIGS. 8A and B. A total of four patches are used, with two alternating colors. If the light output from an overlap zone is designated as "high" and from a gap zone as "low", a flip-flop can be used to determine the number of "highs" or "lows" in a pattern and identify the direction of convergence error. FIG. 8A illustrates a pattern with patches 42 shifted to the left with respect to reference patches 43. It is apparent that two overlap or "high" zones 44 are present. FIG. 8B shows patch 42 shifted to the right with respect to reference patches 43. Only one overlap or "high" zone 44 is present. It is therefore a simple matter to employ flip-flop to determine the number of "high" zones and hence the direction of convergence error. This technique is useful for measuring either horizontal or vertical misconvergence.

In addition to applying the summer 29 output to output device 26, the value of measured misconvergence could be used in a feedback arrangement by which convergence adjustment devices could be operated. The use of the measurement system in conjunction with a yoke adjustment machine (YAM) could be made, thereby providing automatic convergence adjustment of a yoke and kinescope combination during production and assembly. The measuring system could also be used to measure misconvergence of unconverged tubes, in order to provide an indication whether or not such tubes could eventually be properly converged. This initial testing could save much time in determining if tube specifications were met before extensive converging attempts were made.

The speed of the measuring system described herein is dependent on a number of factors, one of which is the number of convergence locations that are tested. Decreasing the number of locations increases speed, but it also decreases the ability to determine the cause and correction for the measured misconvergence due to the limited amount of convergence data. It has been found that a maximum number of 25 locations provides sufficient convergence information to accurately correct the observed misconvergence.

The size of the convergence pattern displayed also determines the speed of the measuring system. Decreasing the pattern size increases measuring speed and reduces averaging errors over large areas, but random errors in displayed patterns can reduce measurement accuracy. Small patterns also limit the size of misconvergence that can be measured, as the amount of overlap and gap is limited. Large patterns eliminate random errors or glitches through averaging redundancy and allow larger misconvergences to be measured, but measurement time is correspondingly increased. It is also possible to display and measure more than one test pattern at a time by increasing the processing speed, thereby, increasing the speed at which the convergence measurements are made. An analysis of the desired uses of the measurement system and of the specific needs should be made before a determination of pattern size or number is made.

As an alternative, horizontal and vertical misconvergence may be measured from a single pattern having diagonally extending patches. Measurement of the overlap and gaps between these patches would provide both a horizontal and vertical misconvergence component, thereby eliminating the need for individual horizontal and vertical measurements.

It is also possible to illuminate all pattern locations simultaneously and control the camera operation to sample particular patterns, or to sample all patterns during one scanning sequence, storing pattern information in memory for later processing.

What is claimed is:

1. A convergence measurement apparatus for use with a color television display system, said display system comprising a kinescope having a display screen and incorporating three electron beam producing means, and a deflection yoke for deflecting said beams in horizontal and vertical directions to form a raster on said display screen, said apparatus comprising:

means for activating one of said electron beam producing means to generate a first beam display area on said kinescope display screen;

means for activating another of said beam producing means to generate second and third beam display areas on said kinescope display screen, said second and third display areas occurring on opposite boundaries of said first display area and contiguous with said first display area upon occurrence of the convergence of said one and said other of said beams in the vicinity of said display areas, said first display area overlapping one of said second or third display areas to form an overlap zone and an associated gap zone upon occurrence of the misconvergence of said one and said other of said beams;

scanning means for detecting the light emitted from said first, second and third display areas, and from said overlap and gap zones, if any, in a predetermined order;

means, responsive to the output of said scanning means, for developing a signal indicative of the order of occurrence of said overlap and gap zones, if any, and having an amplitude representative of the width of said overlap and gap zones;

means, responsive to said developed signal, for modifying one of said means for activating said beam producing means so as to effect a movement of said first beam display area with respect to said second and third beam display areas in a direction tending to reduce the amplitude of said developed signal; and means for indicating the amount of relative motion of said display areas needed to minimize the amplitude of said developed signal.

2. The arrangement defined in claim 1, wherein said scanning means comprises a monochrome television camera.

3. The arrangement defined in claim 1, wherein said signal developing means comprises:

means, responsive to the output of said scanning means, for forming a pulse having a substantially constant amplitude, having a polarity representative of the order of occurrence of said overlap and gap zones, if any, and having a width representative of the width of said overlap and gap zones; and means for integrating said pulse to form said developed signal having a polarity representative of the order of occurrence of said overlap and gap zones and having an amplitude representative of the width of said overlap and gap zones.

4. The arrangement defined in claim 3 wherein said modifying means is responsive to the polarity of said developed signal.

5. The arrangement defined in claim 1, wherein said second and third beam display areas occur on opposite sides of said first beam display area such that said first, second and third beam display areas are horizontally aligned.

6. The arrangement defined in claim 5, wherein said signal developing means comprises:

means for delaying the output of said scanning means by a time interval substantially equal to the time required to scan the width of one of said beam display area to form a second scanned signal;

gated combining means, responsive to the outputs of said scanning means and said delaying means, for forming a combined signal comprising a signal component having a substantially constant amplitude, having a polarity representative of the order of occurrence of said overlap and gap zones and having a width representative of the width of said overlap and gap zones; and means for integrating said combined signal to form said developed signal having a polarity representative of the order of occurrence of said overlap and gap zones and having an amplitude representative of the width of said overlap and gap zones.

7. The arrangement defined in claim 1, wherein said second and third beam display areas occur respectively above and below said first beam display area such that said first, second and third beam display areas are vertically aligned.

8. The arrangement defined in claim 7, wherein said signal developing means comprises:

means, responsive to the output of said scanning means, for generating a first scanned signal comprising signal components corresponding to respective overlap and gap zones, each of said signal components having a substantially constant amplitude, having a width representative of the width of said respective overlap and gap zones, and having a polarity indicative of one of said respective overlap and gap zones;

means for modifying said first scanned signal by inverting said signal during the last half of its duration to form a second scanned signal; and means for integrating said second scanned signal to generate said developed signal having a polarity indicative of the order of occurrence of said overlap and gap zones and having an amplitude representative of the width of said overlap and gap zones.

9. The arrangement defined in claim 1, wherein said opposite boundaries of said first display area extend at an angle intermediate the vertical and horizontal axes of said kinescope display screen.

10. The arrangement defined in claim 1, wherein said means for activating one of said electron beams additionally produces a fourth beam display area on said kinescope display screen, said first and fourth display areas occurring on opposite boundaries of said third display area and contiguous with said third display area upon occurrence of the convergence of said one and said other of said beams in the vicinity of said display areas.

11. The arrangement defined in claim 10, wherein said scanning means produces a signal incorporating respective signal components of a first polarity indicative of the presence of each of said overlap zone occurrences, if any, and respective signal components of a second polarity indicative of the presence of each of said gap zone occurrences, if any; and wherein said signal developing means incorporates means for indicating the order of occurrence of said overlap and gap zones comprising:

means for determining the number of signal components having a predetermined one of said first or second polarities; and means, responsive to the output of said determining means, for indicating the order of occurrence of said overlap and gap zones.

* * * * *